(12) United States Patent
Maher

(10) Patent No.: US 11,930,725 B2
(45) Date of Patent: Mar. 19, 2024

(54) COMBINED SHOVEL AND STORAGE DEVICE

(71) Applicant: Eric Jason Maher, Grand Falls Windsor (CA)

(72) Inventor: Eric Jason Maher, Grand Falls Windsor (CA)

(*) Notice: Subject to any disclaimer, the term of this patent is extended or adjusted under 35 U.S.C. 154(b) by 902 days.

(21) Appl. No.: 16/943,391

(22) Filed: Jul. 30, 2020

(65) Prior Publication Data
US 2021/0029861 A1  Feb. 4, 2021

Related U.S. Application Data

(60) Provisional application No. 62/882,075, filed on Aug. 2, 2019.

(51) Int. Cl.
| | |
|---|---|
| *A01B 1/02* | (2006.01) |
| *A01B 1/22* | (2006.01) |
| *B60R 11/06* | (2006.01) |
| *B60R 11/00* | (2006.01) |

(52) U.S. Cl.
CPC ............ *A01B 1/022* (2013.01); *A01B 1/22* (2013.01); *B60R 11/06* (2013.01); *B60R 2011/0066* (2013.01)

(58) Field of Classification Search
CPC .......... A01B 1/022; A01B 1/22; B60R 11/06; B60R 2011/0066
USPC .......................... 206/216; 7/118; 294/51, 58
See application file for complete search history.

(56) References Cited

U.S. PATENT DOCUMENTS

| 3,659,888 | A | * | 5/1972 | Dreier | ............... | A01B 1/02 |
| | | | | | | 294/51 |
| 6,439,630 | B1 | * | 8/2002 | Eatmon | ............... | A01B 1/00 |
| | | | | | | 294/51 |
| 2002/0184713 | A1 | * | 12/2002 | Dallas | ............... | A01B 1/022 |
| | | | | | | 7/116 |
| 2008/0178498 | A1 | * | 7/2008 | Sanchelli | ........... | A01B 1/02 |
| | | | | | | 37/241 |
| 2011/0049920 | A1 | * | 3/2011 | Guerra | ............... | B25G 1/00 |
| | | | | | | 294/58 |
| 2011/0214316 | A1 | * | 9/2011 | Gomez | ............... | E01H 5/02 |
| | | | | | | 37/284 |
| 2019/0141913 | A1 | * | 5/2019 | Carlton | ............. | A01G 20/43 |
| | | | | | | 56/400.11 |
| 2019/0330815 | A1 | * | 10/2019 | Nieters | ............. | E01H 5/02 |
| 2020/0131726 | A1 | * | 4/2020 | Pavey | ............... | E01H 5/02 |
| 2021/0008705 | A1 | * | 1/2021 | Sayer | ............... | B25G 3/24 |

(Continued)

*Primary Examiner* — Jacob K Ackun
(74) *Attorney, Agent, or Firm* — Heer Law

(57) ABSTRACT

The present application relates generally to storage devices, and specifically to a combined shovel and storage device for backcountry or all-terrain use comprising a shovel blade and a complementary portion, whereby the shovel blade and the complementary portion are configured to releasably secure together thereby defining a hollow space for storage therebetween. The combined shovel and storage device further includes a shovel shaft, wherein the shovel shaft is of a dimension that can be stored within the hollow space for storage, and wherein the shovel shaft contains a first end with a shovel handle and a second end opposite the first end configured to releasably secure to the shovel blade. Also disclosed is a method of using a combined shovel and storage device to shovel earth, snow, water, or any combination thereof.

15 Claims, 6 Drawing Sheets

(56) References Cited

U.S. PATENT DOCUMENTS

2022/0333324 A1\* 10/2022 Reed .................. E01H 5/02
2023/0241757 A1\* 8/2023 Billingsley ............ B25G 3/32
    294/51

\* cited by examiner

COMBINED SHOVEL AND STORAGE DEVICE

FIELD OF THE INVENTION

The present specification relates generally to storage devices, and specifically to a combined shovel and storage device for backcountry or all-terrain use.

BACKGROUND OF THE INVENTION

For many, spending time outdoors in rural areas constitutes a pleasant pastime. The absence of noise associated with urban areas is relaxing, while the physical activity, exposure to fresh air and sunlight promote physical health and wellbeing.

Snowshoeing, cross-country skiing, snowmobiling, driving all-terrain vehicles, and hiking are some examples of activities often enjoyed outdoors in rural areas. The nature of these activities is such that they often take place amongst rugged terrain and individuals participating in these activities may find themselves in remote, backcountry locations. The risks inherent in these activities, coupled with the risks associated with rural and, particularly, remote rural areas, require participating individuals to take extra care. Prudent individuals will bring with them safety tools when engaging in any of these or other outdoor activities.

A shovel is a critical safety tool for individuals spending time outdoors in remote, rural areas. Currently, safety-conscious individuals will pack a shovel in a knapsack or storage unit attached to a snowmobile, all-terrain, or other vehicle. Alternatively, individuals may need to carry a shovel or safety tools in hand. The shovel, being an independent piece of equipment, makes it possible for the individual to forget to pack or bring it with them. If an individual does remember to pack a shovel, it may consume a lot of space in their knapsack or other storage device, making it cumbersome to carry and may compromise their ability to bring other important safety tools. Accordingly, there is a need for improvements in the art to provide a convenient and compact way to carry a shovel and other safety items when spending time outdoors in rural areas.

SUMMARY OF THE INVENTION

According to an embodiment of the present invention, there is provided a combined shovel and storage device, comprising: a shovel blade and a complementary portion, whereby the shovel blade and the complementary portion are configured to releasably secure together thereby defining a hollow space for storage therebetween; and a shovel shaft, wherein the shovel shaft is of a dimension that can be stored within the hollow space for storage, and wherein the shovel shaft contains a first end with a shovel handle and a second end opposite the first end configured to releasably secure to the shovel blade.

According to a further embodiment, the present invention provides a method of using a combined shovel and storage device to shovel earth, snow, water or any combination thereof, the method comprising: detaching a shovel blade from a complementary portion; attaching a shovel shaft to the shovel blade; and using the shovel blade and shovel shaft combination as a shovel.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which.

DETAILED DESCRIPTION OF EMBODIMENTS OF THE INVENTION

Figure 1:
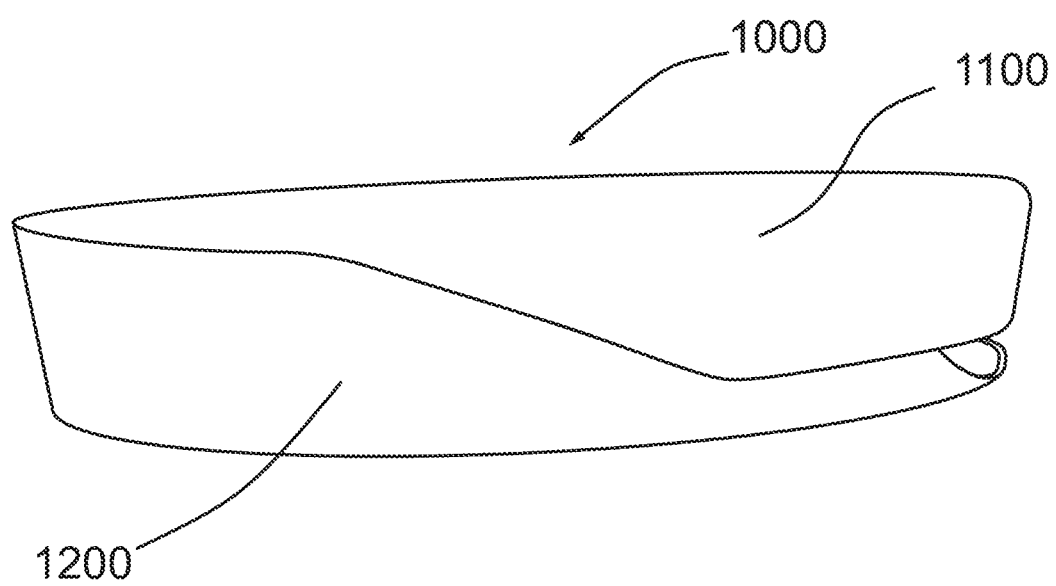
FIG. 1 is a right side view of a combined shovel and storage device, according to an embodiment.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly depict certain features of the invention.

According to an embodiment as shown in FIGS. 1 to 6, a combined shovel and storage device 1000 is generally configured to allow a user to both store items within it and shovel snow, water, earth or any combination thereof using a single, multipurpose device. Due to its convenient and compact configuration, combined shovel and storage device 1000 may decrease the likelihood of forgetting critical outdoor survival tools when travelling in remote outdoor areas, thereby promoting personal safety. Combined shovel and storage device 1000 may further reduce the number of individual items to be carried by a user travelling in remote outdoor areas and increase the ease with which these items can be carried, thereby increasing mobility and reducing physical strain on the user. In addition, combined shovel and storage device 1000 may expand the storage space available on a snowmobile, all-terrain, or other vehicle.

Combined shovel and storage device 1000 may be constructed from materials which provide the mechanical strength and durability to routinely utilize combined shovel and storage device 1000 outdoors, in any and all weather conditions, and to shovel earth, snow, water or any combination thereof. According to an embodiment, combined shovel and storage device 1000 may be made from plastic, such as injection molded plastic or polyvinyl chloride. In other embodiments, combined shovel and storage device 1000 may be constructed of aluminum, steel, fibreglass, other plastics or composites or a combination of suitable materials. Manufacturing costs, desired lifespan, and desired weight may be considerations in informing the choice of materials and construction technique and other design choices of combined shovel and storage device 1000.

According to an embodiment as shown in FIGS. 1 to 6, combined shovel and storage device 1000 includes a shovel blade 1100. According to an embodiment, shovel blade 1100 may have a round mouth shovel shape. According to other embodiments, shovel blade 1100 may have a square mouth or taper mouth shovel shape. According to further embodiments, shovel blade 1100 may take a variety of shapes which may improve its functionality and efficient use as a shovel. According to an embodiment, shovel blade 1100 may include a reflective material. The reflective material may be affixed to the exterior face of shovel blade 1100 to improve the visibility of a user equipped with the combined shovel and storage device 1000.

According to an embodiment as shown in FIGS. 1 to 6, combined shovel and storage device 1000 includes a complementary portion 1200. Complementary portion 1200 may be preferably constructed from a light, durable material such as polyvinyl chloride to make combined shovel and storage device 1000 lighter and more portable. In other embodiments, complementary portion 1200 may be constructed from other suitable materials.

Figure 5:
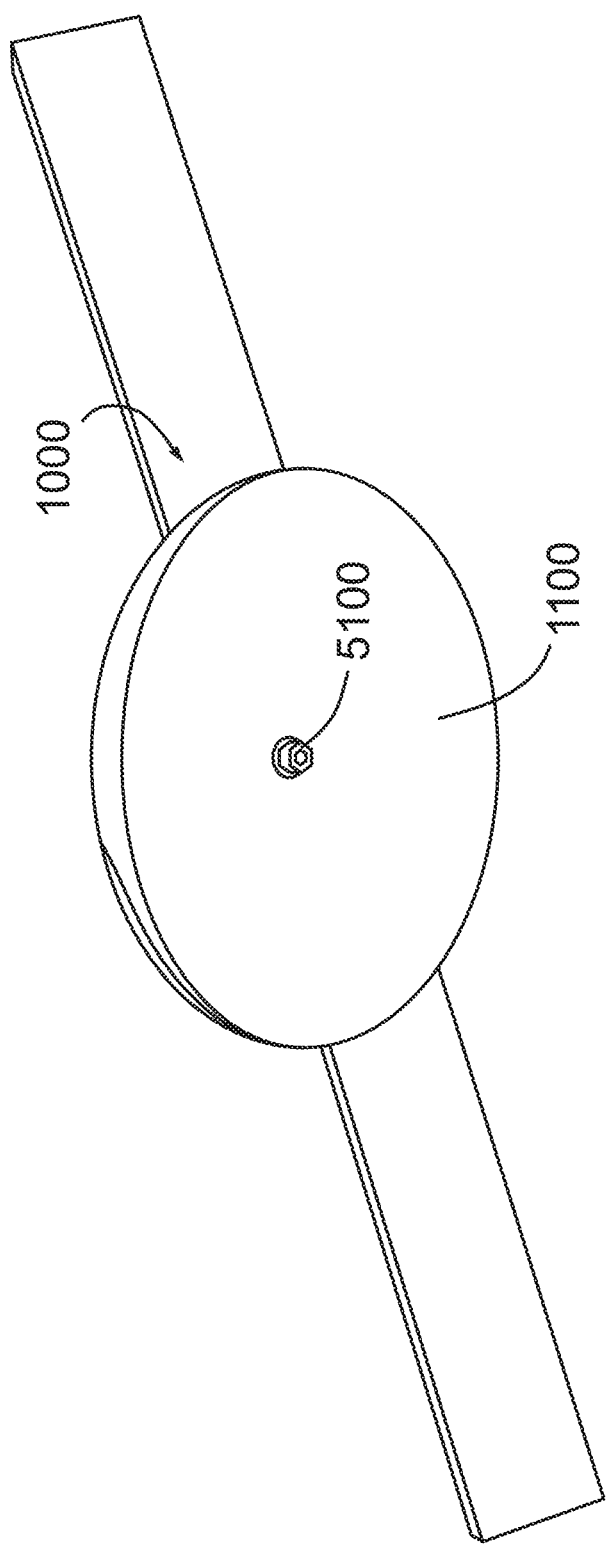
FIG. 5 is a bottom perspective view of the combined shovel and storage device of FIG. 1 mounted on a surface.
Figure 6:
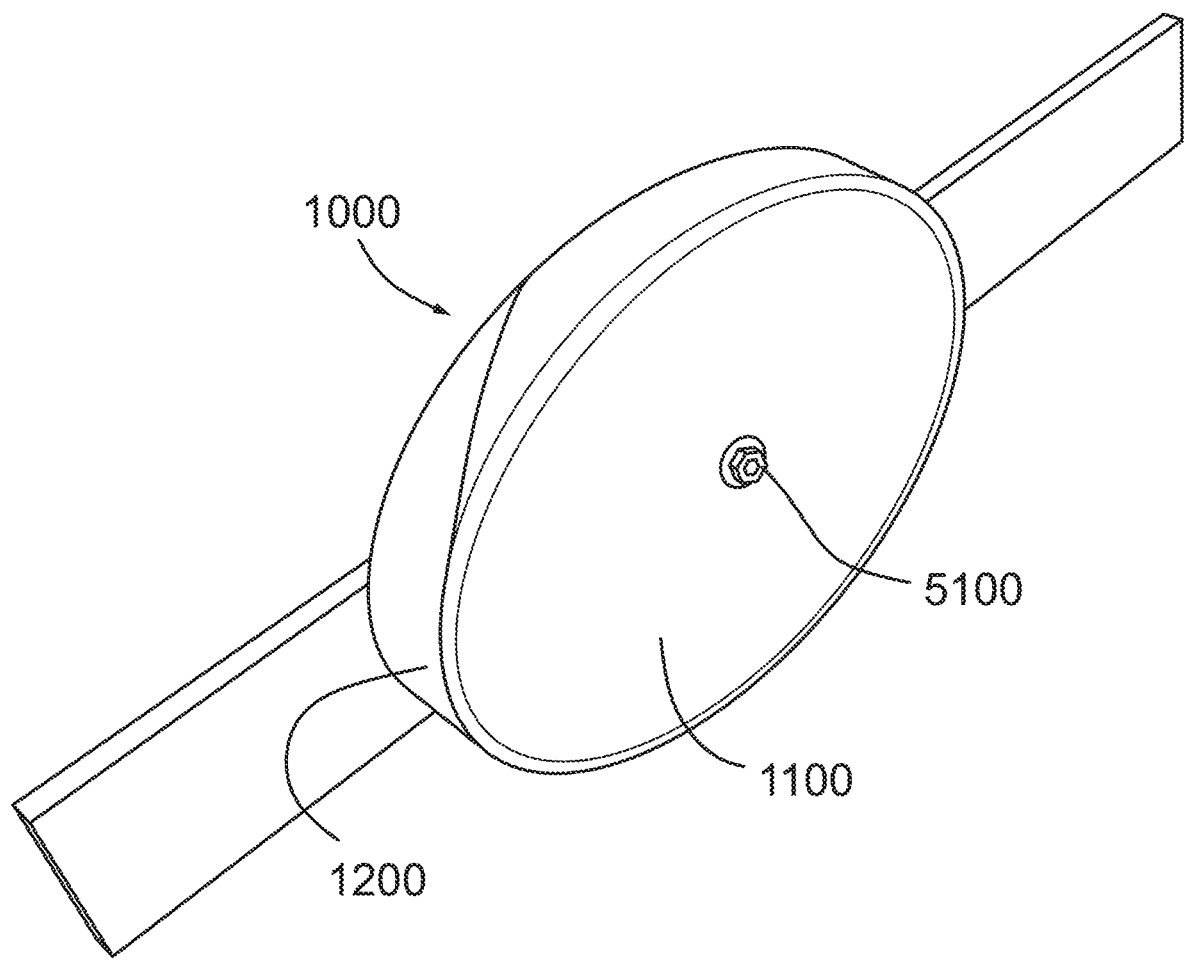
FIG. 6 is a side perspective view of the combined shovel and storage device of FIG. 5.

According to an embodiment, complementary portion 1200 may include a component for mounting complementary portion 1200 to a snowmobile, all-terrain, or other vehicle. According to an embodiment, complementary portion 1200 may include at least one strap affixed to complementary portion 1200 comprising two ends, and at least one quick-release buckle connecting the two ends of the at least one strap. The at least one strap may be looped around a bar, railing, or other protrusion from a snowmobile, all-terrain, or other vehicle and the two ends subsequently connected by the at least one quick-release buckle to secure complementary portion 1200 to the snowmobile, all-terrain, or other vehicle. According to an embodiment, the at least one strap may be adjustable in length. According to an embodiment, as shown in FIGS. 5 and 6, combined shovel and storage device 1000 may include a securing means 5100 for mounting combined shovel and storage device 1000 to a snowmobile, all-terrain, or other vehicle. According to an embodiment, securing means 5100 may be a bolt that passes through corresponding holes in each of a snowmobile, all-terrain, or other vehicle, complementary portion 1200 and shovel blade 1100, and to which a nut is applied and tightened to secure the combined shovel and storage device 1000 to a snowmobile, all-terrain, or other vehicle. Other known securing means may also be used to secure complementary portion 1200 to a snowmobile, all-terrain, or other vehicle.

According to a further embodiment, an interior face of complementary portion 1200 may include a piece for securing to it at least one outdoor survival tool. According to an embodiment, an outdoor survival tool may be secured to complementary portion 1200 using a pocket on the interior face of complementary portion 1200. In other embodiments, other securing means may be used alone or in combination including, for example, straps and clips, to secure at least one outdoor survival tool to complementary portion 1200. According to an embodiment, the at least one outdoor survival tool may be a flare, a hunting knife, a fire starter, or a compass. Other known outdoor survival tools may also be secured to complementary portion 1200.

According to an embodiment of the invention, shovel blade 1100 and complementary portion 1200 are configured to releasably secure together thereby defining a hollow space for storage therebetween. According to an embodiment, shovel blade 1100 and complementary portion 1200 may be releasably secured together using a snap-fit mechanism. According to another embodiment of the invention, shovel blade 1100 and complementary portion 1200 may be releasably secured together by a toggle latch mechanism. According to a further embodiment of the invention, shovel blade 1100 and complementary portion 1200 may be releasably secured together by a mechanism utilizing a bolt that passes through each of a hole in shovel blade 1100 and a corresponding hole in complementary portion 1200 and a nut which is applied to the bolt and tightened to secure the shovel blade 1100 and complementary portion 1200 together, thereby closing the device. Other known securing means may also be used to releasably secure shovel blade 1100 and complementary portion 1200.

Figure 2:
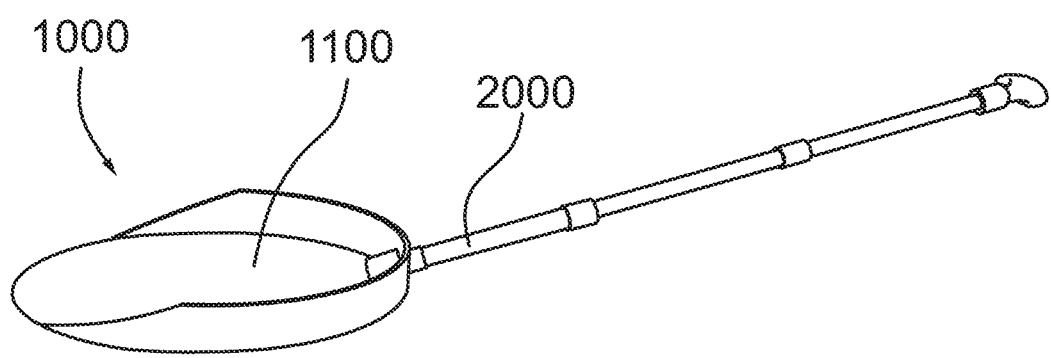
FIG. 2 is a left side perspective view of the combined shovel and storage device of FIG. 1, assembled to be used as a shovel.
Figure 3:
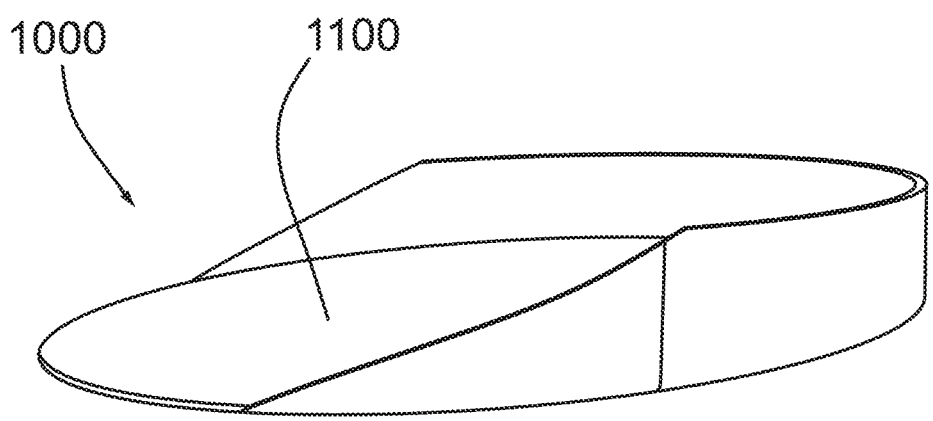
FIG. 3 is a left side perspective view of the combined shovel and storage device of FIG. 1 with the complementary portion removed.
Figure 4:
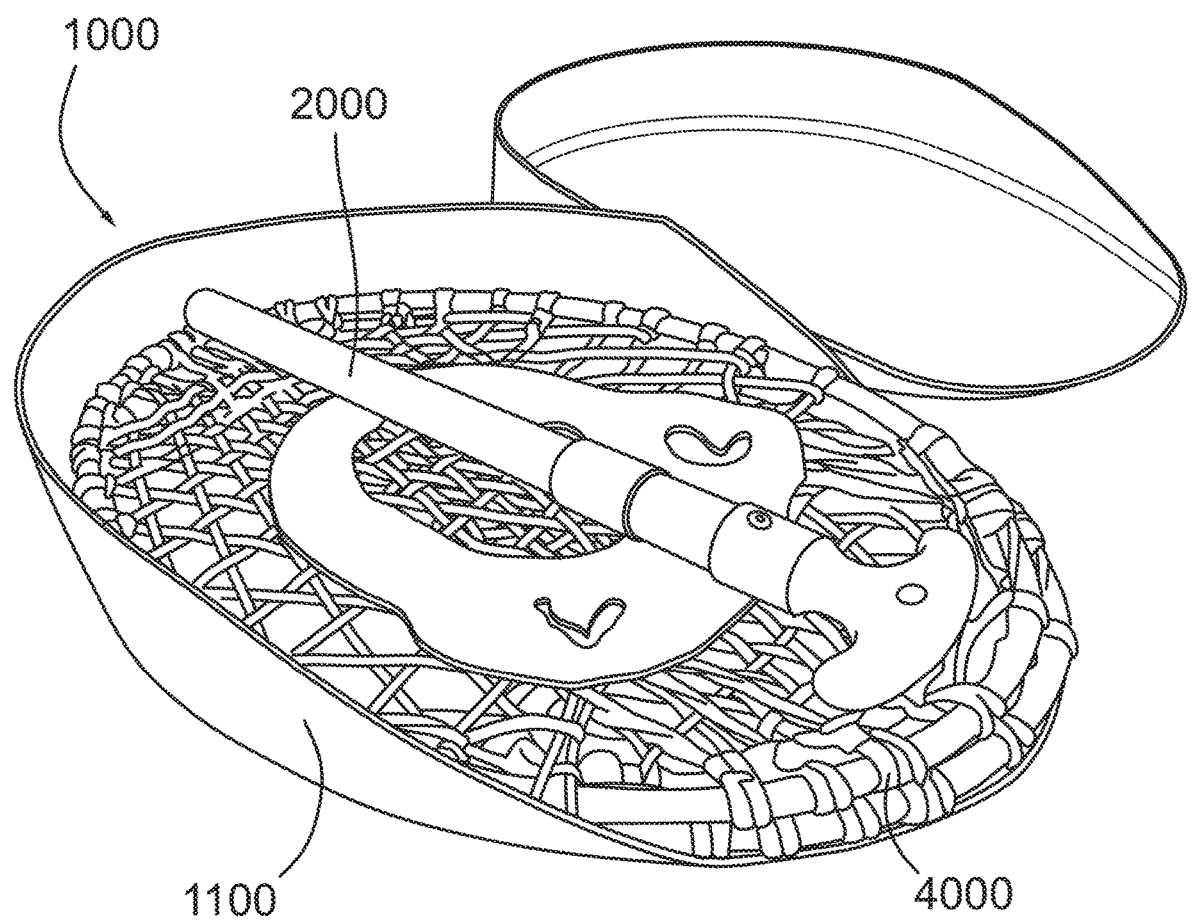
FIG. 4 is a right side perspective view of the combined shovel and storage device of FIG. 3 containing within it a set of snowshoes and a shovel shaft.

According to an embodiment as shown in FIGS. 2 and 4, combined shovel and storage device 1000 includes a shovel shaft 2000, wherein shovel shaft 2000 is of a dimension that can be stored within the hollow space for storage, and wherein shovel shaft 2000 contains a first end with a shovel handle and a second end opposite the first end configured to releasably secure to shovel blade 1100. According to an embodiment, the shovel handle may be ergonomically configured such that the proportions of the shovel handle fit comfortably in a human hand. According to another embodiment, the shovel handle may be a D-shape handle as commonly used in the manufacture of shovels. According to a further embodiment, shovel shaft 2000 may be telescopic, allowing for increased comfort of use while maintaining compactness and the ability to store shovel shaft 2000 in the hollow space between shovel blade 1100 and complementary portion 1200.

According to an embodiment, as shown in FIG. 2, the second end of shovel shaft 2000 is configured to releasably secure to shovel blade 1100. According to an embodiment, the second end of shovel shaft 2000 and shovel blade 1100 may be releasably secured together by a cantilever snap-fit mechanism as commonly employed to secure battery compartment covers, for instance. According to another embodiment, the second end of shovel shaft 2000 and shovel blade 1100 may be releasably secured together by a sex-bolt mechanism wherein either a male or female part is affixed to shovel blade 1100 and either a male or female part is affixed to the second end of shovel shaft 2000. Other securing means are possible according to further embodiments of the invention.

According to an embodiment as shown in FIG. 4, shovel blade 1100 and complementary portion 1200 are shaped to accommodate at least one set of snowshoes 4000 and one shovel shaft 2000 in the hollow space for storage.

According to an embodiment as shown in FIG. 2, shovel blade 1100 may be detached from complementary portion 1200 and shovel shaft 2000 attached to shovel blade 1100. This shovel blade and shovel shaft combination may then be used as a shovel to shovel earth, snow, water or any combination thereof.

Various embodiments of the invention have been described in detail. Since changes in and or additions to the above-described best mode may be made without departing from the nature, spirit or scope of the invention, the invention is not to be limited to those details but only by the appended claims.

What is claimed is:

1. A combined shovel and storage device, comprising:
a shovel blade and a complementary portion, whereby the shovel blade and the complementary portion are configured to releasably secure together thereby defining a hollow space for storage therebetween; and
a shovel shaft, wherein the shovel shaft is of a dimension that can be stored within the hollow space for storage, and wherein the shovel shaft contains a first end with a shovel handle and a second end opposite the first end configured to releasably secure to the shovel blade.

2. The device of claim 1, further comprising a component for mounting the complementary portion to a snowmobile, all-terrain, or other vehicle.

3. The device of claim 1, wherein the shovel blade and the complementary portion are releasably secured together by a snap-fit mechanism.

4. The device of claim 1, wherein the shovel blade and the complementary portion are releasably secured together by a toggle latch clamp mechanism.

5. The device of claim 1, wherein the shovel blade and the complementary portion are releasably secured together by a mechanism comprising:
a hole in the shovel blade and a corresponding hole in the complementary portion;
a bolt which passes through the hole in the shovel blade and the corresponding hole in the complementary portion; and
a nut which is applied to the bolt and tightened to secure the shovel blade and the complementary portion together thereby closing the device.

6. The device of claim 1, wherein an interior face of the complementary portion further comprises a piece for securing to the complementary portion at least one outdoor survival tool.

7. The device of claim 1, wherein the second end of the shaft is configured to releasably secure to the shovel blade by way of a cantilever snap-fit mechanism.

8. The device of claim 1, wherein the second end of the shaft is configured to releasably secure to the shovel blade by way of a sex-bolt mechanism comprising a male and female part, wherein either the male or female part is affixed to the shovel blade and either the male or female part is affixed to the second end of the shaft.

9. The device of claim 2, wherein the component for mounting the complementary portion to the snowmobile, all-terrain, or other vehicle comprises:
at least one strap affixed to the complementary portion comprising two ends; and
at least one quick-release buckle connecting the two ends of the at least one strap.

10. The device of claim 9, wherein the at least one strap is adjustable in length.

11. The device of claim 1, wherein the shovel blade and the complementary portion are shaped to accommodate at least one pair of snowshoes in the hollow space for storage.

12. The device of claim 1, wherein an exterior face of the shovel blade further comprises a reflective material.

13. The device of claim 1, wherein the shovel blade has a round mouth shovel shape.

14. The device of claim 1, wherein the shovel blade has a taper mouth shovel shape.

15. The device of claim 1, wherein the shovel blade has a square mouth shovel shape.

* * * * *